United States Patent Office 3,362,909
Patented Jan. 9, 1968

3,362,909
DEICER COMPOSITION
John F. Georgal and Donald R. Rink, Buffalo, N.Y., assignors to Union Carbide Corporation, a corporation of New York
No Drawing. Filed Sept. 30, 1964, Ser. No. 400,591
7 Claims. (Cl. 252—70)

This invention is directed to a novel chemical composition and more particularly to a composition for the removal of ice and frost from an automobile windshield.

The prior art has provided a number of deicer compositions, all of which have been found to have one or more attendant disadvantages. For example, the use of deicer compositions containing low boiling alcohols to defrost automobile windshields has been found to be hazardous due to the inflammable nature of the alcohol. In addition, such alcohols tend to attack any painted surface adjacent to the surface which is to be defrosted. Such attack is particularly severe and very undesirable when automobile finishes are involved. Other deicer compositions which are not detrimental to automobile finishes are found to be quite viscous and thus to smear the surface. In the case of automobile windshields, such smearing reduces visibility and causes severe optical distortion, thus creating a serious safety hazard.

In addition to these serious failings of the deicer compositions of the prior art, the mode and manner in which they are dispensed has left much to be desired. For obvious reasons, a preferable way of dispensing a deicer composition is from a pressurized or aerosol container. Unfortunately, the use of a liquefied gas as the propellant is limited due to the high pressures which must be employed. A common failing of prior art aerosol devices, which use a gas such as nitrogen, is caused by the fact that the pressure-volume behavior of such a gas is similar to that of an ideal gas. Thus, the pressure in the aerosol container drops off rapidly as the contents are removed. In order to remove all the contents, using nitrogen as the propellant, the initial pressure would have to be excessive or the container would have to be greatly underfilled to give a large headspace. In addition, many prior art aerosols have a weak spray pattern at low temperatures due to the characteristics of the propellant which is employed.

One of the more serious shortcomings of the commercially available deicer compositions is the tendency to cause smearing and optical distortion on the automobile windshield. In cases where an alcohol is used to reduce smear the result is merely temporary. When the alcohol evaporates a film of ethylene glycol and water is left on the glass surface. This film is smeared across the glass when the windshield wipers are activated and results in reduced visibility.

It is therefore an object of this invention to provide a novel deicer composition which has superior deicing and defrosting properties.

It is a further object to provide a deicer composition which does not smear on a glass surface and does not reduce visibility or cause optical distortion.

It is a further object to provide a deicer composition which has a high flash point.

It is another object of the invention to provide a deicer composition which conditions the glass surface to render it more easily wetted by latter applications of water.

It is still another object to provide a packaged deicer composition complete with a compatible propellant which has a good spray pattern at low temperatures.

The above-described objects are achieved by a deicer composition having a pH of at least 7.5 and comprising normal propanol, ethylene glycol, an alkaline additive, a levelling agent and water. In the packaged embodiment of the invention a soluble, non-buffering propellant is employed. In addition, a corrosion inhibitor such as morpholine may be added to the formulation.

In order that the herein disclosed windshield deicer composition will perform satisfactorily when packaged in an aerosol can, it is necessary that a non-buffering propellant be used in place of the commonly employed carbon dioxide propellant. When carbon dioxide is dissolved in water it reacts and ionizes to form bicarbonate and carbonate ions which buffer the solution at a pH below 7. This buffering action reduces the effectiveness of any alkaline additives which are used to provide the superior characteristics described above.

In the practice of the invention, a superior non-smear deicer composition comprises from about 25 to about 95 weight percent normal propanol, about 5 to about 50 weight percent ethylene glycol, about 10 to about 25 weight percent water and active amounts of an alkaline additive and a levelling agent.

Preferred formulations contain about 50 to about 60 weight percent normal propanol, about 20 to about 35 weight percent ethylene glycol, about 10 to 20 weight percent water, about 0.01 to about 5.0 weight percent of the tetrasodium salt of ethylenediaminetetraacetic acid, and from 0.01 to about 5.0 weight percent of a trimethyl nonylether of polyethylene glycol.

In view of the optical distortion caused by residue films which remain on a windshield after all the liquid has evaporated it is highly important to maintain the amount of solids added to the water-alcohol-glycol mixture at a rather low level. Formulations containing 5 weight percent total solids or less are therefore preferred. Formulations containing about 0.01 to about 1.0 weight percent of the ethylenediaminetetraacetic acid salt and about 0.01 to about 1.0 weight percent of the trimethyl nonylether of polyethylene glycol have been found to provide superior non-smear properties and freedom from residue films.

The term "active amounts" as used herein means an amount of that particular agent which is sufficient to provide the superior non-smear properties which are characteristic of the invention. With respect to the alkaline agent an active amount must provide a pH of at least about 7 and preferably at least about 7.5.

The aerosol composition of the invention may be made by adding a non-buffering propellant to the composition, and preferably a small amount of a corrosion inhibitor such as morpholine. The propellant is added to the deicer composition in sufficient amounts to give an equilibrium pressure of about 85 to 90 pounds per square inch gauge at 70° F.

Alkaline additives suitable for use in the instant invention include metal hydroxides such as potassium and sodium hydroxide; inorganic alkaline sequestering agents such as the condensed polyphosphates, for example, sodium tripolyphosphate sodium hexametaphosphate and the like; and organic alkaline sequestering agents such as aminopolycarboxylic acid salts, for example, sodium salts of ethylenediaminetetraacetic acid and nitrilotriacetic acid.

Suitable sequestering agents that can be used in the present formulations are the water-soluble salts of aminocarboxylic acids and mixtures thereof. Typical of such agents are tetrasodium ethylene diamine tetra-acetate, tetrasodium ethylene diamine tetra-propionate, tetrapotassium propylene diamine tetra-acetate, tetrasodium ethylene diamine tetra-butyrate, trisodium nitrilotriacetate, and the like. The preferred sequestering agent is tetrasodium ethylene diamine tetra-acetate. Moreover, certain anionic surface active agents possess the required alkalinity to function as both a levelling agent and an alkaline additive, thus providing the desirable feature of a solution having a lower concentration of dissolved solids. Such bifunctional anionics which provide the requisite alkaline pH, include sodium tetradecyl sulfate, sodium 2-ethylhexyl sulfate and the like.

The levelling agents contemplated are anionic and nonionic surface active agents and preferably those which are normally liquid and miscible with water in all proportions.

Suitable levelling agents include anionic surface active agents, i.e., those in which the ion containing the large hydrophobic group is negatively charged. Generally, the associated cation is a simple metallic ion. Suitable anionic levelling agents include the alkylarenesulfonates, fatty acid sulfates, sodium salts of sulfated monoglycerides, esters of sodium sulfosuccinic acid and the like. More specifically, suitable anionic levelling agents include sodium heptadecyl sulfate, sodium lauryl sulfate, sodium salts of di(2-ethylhexyl)sulfosuccinic acid, sodium tetradecyl sulfate, and the like.

Additional suitable levelling agents are nonionic surfactants. The term "nonionic surfactant" as used herein and in the appended claims means an organic compound of a relatively high molecular weight and which consists of a hydrophobic portion to which is attached a hydrophillic or solubilizing portion such as ether linkages, (—C—O—C—)

hydroxyl groups (—OH), carbonyloxy groups

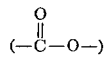

and the like. With very few exceptions, the nonionic surface active agents contain at least one hydroxyl group.

Specifically contemplated within the above definition of nonionic are surfactants having as the hydrophillic moiety one or more chains containing one or more alkyleneoxy groups. These surfactants have the general formula R—(Y—H)$_y$ wherein R is the hydrophobic portion of an aliphatic alcohol containing from about 8 to about 22 carbon atoms or an alkylated phenol containing from about 4 to about 22 carbon atoms in the alkyl group thereof, Y is an alkyleneoxy chain, H is a hydrogen atom bonded to an oxygen atom of the alkyleneoxy chain, and y is an integer from 1 to about 6, and preferably from 1 to 4.

Typical aliphatic alcohols are octyl alcohol, nonyl alcohol, decyl alcohol, "coco" alcohol (a mixture of $C_{10}$ to $C_{16}$ alcohols), dodecyl alcohol, oleyl alcohol, tallow alcohol (a mixture of $C_{16}$ to $C_{18}$ alcohols), octadecyl alcohol, 2,6,8-trimethyl-4-nonyl alcohol, and the like.

Typical alkylated phenols are butylphenol, pentylphenol, hexylphenol, octylphenol, nonylphenol, dodecylphenol, hexadecylphenol, octadecylphenol, nonadecylphenol, and the like.

By the term "alkyleneoxy chain" as used herein and in the appended claims is meant a chain containing one or more alkyleneoxy groups which are divalent alkylene groups such as methylene, ethylene, propylene, butylene, and the like, bonded to an oxygen atom in a manner such that one of the valences of the alkyleneoxy group is from an oxygen atom and the other is from a carbon atom. Typical alkyleneoxy groups are methyleneoxy (—CH$_2$—O—)

ethyleneoxy (—C$_2$H$_4$O—), propyleneoxy (C$_3$H$_6$O—), butyleneoxy (—C$_4$H$_8$O—), and the like.

Preferred non-ionic surfactants for the instant formulations are the polyalkylene glycol ethers containing from about 4 to about 80 moles of alkylene oxide. Illustrative preferred non-ionic surfactants are the nonylphenyl polyethylene glycol ethers containing about 4 moles of ethylene oxide, the trimethyl nonyl polyethylene glycol ethers containing about 6 moles ethylene oxide, the nonylphenyl polyethylene glycol ethers containing about 7 moles of ethylene oxide, mixed polyalkylene glycol ethers containing about 60 moles of a mixture of ethylene oxide and 1,2-propylene oxide in a mole ratio of about 2:1, and the like.

A specific example of the preferred aerosol deicer composition may be prepared as follows. To every 100 parts by weight of a deicer composition comprising 54.3 weight percent normal propanol, 24 weight percent ethylene glycol, 20.3 weight percent water, 0.2 weight percent of the tetra sodium salt of ethylenediaminetetraacetic acid, 0.9 weight percent trimethyl nonylether of polyethylene glycol, 0.2 weight percent morpholine is added. For every 100 parts of this mixture, 2 parts by weight of nitrous oxide is added or about 7.5 grams per 14 ounces of deicer composition plus inhibitor.

In order to more fully understand the invention, the function of each component of the compositions of the invention will be separately discussed.

Normal propanol contributes to the low viscosity and high flash point of the deicer composition of the invention. In this connection, normal propanol should be distinguished from isopropanol which, while having the same chemical formula, differs structurally from normal propanol. Prior art compositions made with isopropanol have an undesirably low flash point and a viscosity higher than normal propanol compositions. In direct contrast, the composition of the subject invention employing normal propanol has a flash point of 95° F. and accordingly is not easily ignited. In addition, normal propanol has a higher boiling point than isopropanol, hence, a lower evaporation rate. Accordingly, it will remain on the iced surfaces longer and give a more efficient penetration. It also cools the surface less due to its vaporization heat requirements.

A 50–60 percent by weight concentration of normal propanol is preferred, since this enables the composition to contain a maximum amount of ethylene glycol with an optimum product viscosity. The preferred composition has a viscosity of about 24 centistokes at 0° F. Maximum viscosity for good sprayability is about 30 centistokes at any temperature that the product may be used.

The ethylene glycol contributes chiefly to the melting of the frost and ice. Aided by the penetrating action of the normal propanol, it acts quickly. A 25–35 percent by weight concentration is preferred for high melting capacity and ease of handling.

Optical distortion caused by a concentrated film of ethylene glycol is effectively reduced if some water is contained in the deicer composition. The water also serves as a source of heat for melting the frost or ice. If only the surface of the glass is relied on as a source of heat, the surface could be sufficiently cooled to refreeze the melted ice. The high specific heat of water allows it to give up large quantities of heat with a relatively small temperature drop. Thus the water acts as a heat reservoir during the melting process.

The alkaline agent contributes to the wettability of the glass surface and provides a pH of at least 7.5. The smearing phenomena associated with deicers containing ethylene glycol is due largely to the hydrophobic nature of the glass surface. Factors such as the presence of road film and the hydrophobicity of the surface prevent uniform wetting of the glass. Instead the water tends to form into tiny beads or droplets which cause fogginess and optical distortion. Similar conditions are frequently observed during a light rain even in the absence of a deicer film. If the windshield surface is hydrophilic, water or the deicer will wet the glass and form a smooth continuous film. It has been found that due to atmospheric conditions most automobile windshields are corroded and have become hydrophobic since the alkaline components of the glass which contribute hydrophilicity have been leached out. Alkaline sequestering agents are preferred as the alkaline additive because they tend to form a tenacious film on the glass which contributed not only to the initial wetting of the glass but also to a residual wettability which is highly desirable in that subsequent exposure to moisture does not result in the formation of beads and droplets of moisture on the glass surface.

Although smearing is reduced by the glass wetting properties of the alkaline additive, a second type of optical distortion is caused by the formation of an uneven spreading of the deicer film at the temperatures at which deicers are used. The film is found to be thick in some areas and thin in other areas. This uneven film is avoided through the use of a levelling agent such as nonionic or anionic surfactant.

Experimental work has shown that the deicer composition itself does not present a container-corrosion problem in ferrous metal containers even with water present in the composition if the containers are lined with a suitable protective coating. Suitable liner compositions are phenolic and epoxy resins. If desired, a small amount of morpholine may be added to protect the container in case pinholes appear or the coating is damaged during fabrication. Other compounds that can be used for this purpose are morpholine phosphate and the like.

As a further aid in preventing corrosion of metal containers, water having a relatively low ion content is preferred. Distilled or deionized water is suitable for this purpose. However, if non-corrosive containers such as plastic or glass are used, tap water having a relatively high ion content can be successfully employed for the purposes of this invention. The deicing properties of the composition are not affected by the ion content of the water used.

While the deicer composition can be effectively applied to a surface by means of an atomizer, a spray nozzle or head, or even by means of a brush, in the preferred embodiment, the deicer is applied to the surface from a pressurized container.

For this purpose nitrous oxide is the preferred propellant, particularly since it is partially soluble in the deicing composition. As the headspace within the container increases due to the removal of the contents, some of the dissolved nitrous oxide will leave the solution to fill the void. This effectively dampens the pressure dropoff as the container is emptied and leaves an adequate terminal pressure to exhaust all the contents in a desirable manner.

Partially solubility of the propellant gas in the deicer composition is desirable also for another reason. As the material is sprayed, an aerosol action is achieved when the dissolved gas expands and breaks up the spray as it reaches the atmosphere.

The deicer composition of the invention is also useful in preventing ice and frost formation. A dry windshield can be sprayed with the deicer composition prior to exposure to frosting and icing conditions. As long as some deicer is present on the windshield, frost formation will be prevented or at least retarded. This retardation effect can last from several hours up to about half a day depending on the weather, i.e., rain and strong winds will tend to accelerate the removal of the deicer composition from the windshield. However, even after the windshield becomes covered with frost and ice after prolonged exposure to inclement weather, the ice is more easily removed since the thin coating of deicer composition on the windshield prevents the ice from sticking tightly.

Specific examples illustrating the success of the composition of the invention are given below:

*Example I*

To a deicer composition comprising 25 weight percent ethylene glycol, 55 weight percent normal propanol and 20 weight percent water were added various amounts of the tetra sodium salt of ethylene diamine tetraacetic acid (EDTA) and various amounts of trimethyl nonyl ether of polyethylene glycol (TMN). The resulting compositions were then spread on glass plates by windshield wiper blades and evaluated by visual observation to determine the visibility through a plate of glass which was representative of the average automobile windshield after being subjected to average driving conditions. The amounts of each additive and the results of the test are tabulated below

|  | EDTA, percent by weight | TMN, percent by weight | Visibility |
|---|---|---|---|
|  | .04 | .45 | Fair. |
|  | .12 | .45 | Do. |
|  | .20 | .09 | Poor to fair. |
|  | .20 | .27 | Do. |
|  | .20 | .45 | Fair. |
|  | .20 | .54 | Do. |
|  | .20 | .78 | Good. |
| Control | 0 | 0 | Heavy smearing. |

All of the above compositions containing the additives showed a tendency to improve subsequent wettability of the glass plate.

*Example II*

A deicer comprising 54.5 weight percent normal propanol, 24.0 weight percent ethylene glycol, 20.4 weight percent water, 0.2 weight percent of the tetrasodium salt of ethylene diamine tetra acetic acid, and 0.9 weight percent trimethyl nonyl ethylene glycol ether was prepared. Fourteen ounces of the formulation was added along with 7.45 grams of nitrous oxide to a 16 ounce aerosol container. The aerosol was then subjected to pressure-volume spray pattern studies at 0° F. and 77° F.

|  | Pressure (p.s.i.g.) at 77° F. | Pressure (p.s.i.g.) at 0° F. |
|---|---|---|
| 14 ounces | 84 | 47 |
| ¾ full | 44 | 34 |
| ½ full | 35 | 29 |
| ¼ full | 32 | 25 |
| Empty | 26 | 21 |

The above data illustrates that nitrous oxide is capable of maintaining pressure sufficient to empty the container. All the spray patterns were judged to be satisfactory for even distribution of the deicer fluid.

*Example III*

A number of automobiles were exposed to winter weather conditions. Ice and snow on the windshields of the test vehicles was removed by the preferred aerosol deicer composition of this invention. Better visibility, less smearing, and film or oily surface was evident.

What is claimed is:

1. A non-smearing deicer composition consisting essentially of 25 to 95 weight percent normal propanol, 5 to 50 weight percent ethylene glycol, .01 to 5.0 weight percent of an alkaline additive selected from the group consisting of alkali metal hydroxides, sodium tripolyphosphate, sodium hexametaphosphate, tetrasodium ethylene diamine tetra-acetate, tetrasodium ethylene diamine tetra-propionate, tetrapotassium propylene diamine tetra-acetate, tetrasodium ethylene diamine tetra-butyrate and trisodium nitrilotriacetate, 0.1 to 5.0 weight percent of a leveling agent selected from the group consisting of sodium heptadecylsulphate, sodium lauryl sulphate, sodium salts of di(2-ethylhexyl) sulfosuccinic acid, sodium tetradecyl sulphate, nonylphenyl polyethylene glycol ethers containing about 4 moles of ethylene oxide, trimethylnonyl polyethylene glycol ethers containing about 6 moles of ethyleneoxide, nonylphenyl polyethylene glycol ethers containing about 7 moles of ethylene oxide and mixed polyalkylene glycol ethers containing about 60 moles of a mixture of ethylene oxide and 1,2-propylene oxide in a mole ratio of about 2:1, and water; said alkaline additive providing a pH of at least 7.

2. A non-smearing deicer fluid consisting essentially of 50 to 60 weight percent normal propanol, 25 to 35 weight percent ethylene glycol, about 0.04 to about 1.0 weight percent of the tetrasodium salt of ethylenediaminetetraacetic acid, about 0.09 to 1.0 weight percent of a trimethylnonylether of polyethylene glycol, and the balance water; said deicer fluid having a pH of at least 7.5.

3. A non-smearing deicer fluid consisting essentially of about 54.3 weight percent normal propanol, about 24.0 weight percent ethylene glycol, about 0.2 weight percent of the tetrasodium salt of ethylenediaminetetraacetic acid, about 0.9 weight percent trimethylnonyl polyethylene glycol ether having 6 moles of ethylene oxide, about 0.2 weight percent morpholine and the balance water; said deicer fluid having a pH of at least 7.5.

4. In a sealed container which is provided with a spray valve, a non-smear deicer composition consisting essentially of an active portion containing about 54.3 weight percent normal propanol, about 24 weight percent ethylene glycol, about 0.2 weight percent of the tetra sodium salt of ethylenediaminetetraacetic acid, 0.9 weight percent trimethylnonyl polyethylene glycol ether containing about 6 moles of ethylene oxide, about 20.3 weight percent water, and about 0.2 weight percent morpholine; and a propellant portion of nitrous oxide, said propellant being present in about 2 parts by weight to every 100 parts of the active portion, and said deicer composition having a pH of at least 7.5.

5. A non-smearing deicer composition connisting essentially of about 50 to 60 weight percent normal propanol, about 20 to 35 weight percent ethylene glycol, about 10 to 20 weight percent water, about 0.01 to about 5.0 weight percent of the tetrasodium salt of ethylenediaminetetraacetic acid, and about 0.01 to about 5.0 weight percent of a trimethyl nonylether of polyethylene glycol; said deicer composition having a pH of at least 7.5.

6. In a propellant system for dispensing a deicer fluid, the combination of a nitrous oxide propellant and a deicer composition consisting essentially of 25 to 95 weight percent normal propanol, 5 to 50 weight percent ethylene glycol, .01 to 5.0 weight percent of an alkaline additive selected from the group consisting of alkali metal hydroxides, sodium tripolyphosphate, sodium hexametaphosphate, tetrasodium ethylene diamine tetra-acetate, tetrasodium ethylene diamine tetra-propionate, tetrapotassium propylene diamine tetra-acetate, tetrasodium ethylene diamine tetra-butyrate and trisodium nitrilotriacetate, 0.1 to 5.0 weight percent of a leveling agent selected from the group consisting of sodium heptadecylsulphate, sodium lauryl sulphate, sodium salts of di(2-ethylhexyl) sulfosuccinic acid, sodium tetradecyl sulphate, nonylphenyl polyethylene glycol ethers containing about 4 moles of ethylene oxide, trimethylnonyl polyethylene glycol ethers containing about 6 moles of ethyleneoxide, nonylphenyl polyethylene glycol ethers containing about 7 moles of ethylene oxide and mixed polyalkylene glycol ethers containing about 60 moles of a mixture of ethylene oxide and 1,2-propylene oxide in a mole ratio of about 2:1, and water; said alkaline additive providing a pH of at least 7.

7. The method of removing ice and frost formations from an automobile windshield which comprises applying directly to said ice and frost formations a deicer composition consisting essentially of 25 to 95 weight percent normal propanol, 5 to 50 weight percent ethylene glycol, .01 to 5.0 weight percent of an alkaline additive selected from the group consisting of alkali metal hydroxides, sodium tripolyphosphate, sodium hexametaphosphate, tetrasodium ethylene diamine tetra-acetate, tetrasodium ethylene diamine tetra-propionate, tetrapotassium propylene diamine tetra-acetate, tetrasodium ethylene diamine tetra-butyrate and trisodium nitrilotriacetate, 0.1 to 5.0 weight percent of a leveling agent selected from the group consisting of sodium heptadecylsulphate, sodium lauryl sulphate, sodium salts of di(2-ethylhexyl) sulfosuccinic acid, sodium tetradecyl sulphate, nonylphenyl polyethylene glycol ethers containing about 4 moles of ethylene oxide, trimethylnonyl polyethylene glycol ethers containing about 6 moles of ethyleneoxide, nonylphenyl polyethylene glycol ethers containing about 7 moles of ethylene oxide and mixed polyalkylene glycol ethers containing about 60 moles of a mixture of ethylene oxide and 1,2-propylene oxide in a mole ratio of about 2:1, and water; said alkaline additive providing a pH of at least 7.

References Cited
UNITED STATES PATENTS

| | | | |
|---|---|---|---|
| 3,096,290 | 7/1963 | Duane et al. | 262—20 |
| 3,171,752 | 3/1965 | Rankin | 106—13 |
| 2,489,026 | 11/1949 | Gilbert et al. | 106—13 |
| 3,048,263 | 8/1962 | Sacks et al. | 106—13 X |

FOREIGN PATENTS

| | | |
|---|---|---|
| 686,392 | 5/1964 | Canada. |

OTHER REFERENCES

McCutcheon: Detergents and Emulsifiers (1963), p. 149.

Condensed Chemical Dictionary, 6th ed., Reinhold (1962), p. 809.

LEON D. ROSDOL, *Primary Examiner.*

ALBERT T. MEYERS, *Examiner.*

S. D. SCHWARTZ, J. D. WELSH, *Assistant Examiners.*